UNITED STATES PATENT OFFICE.

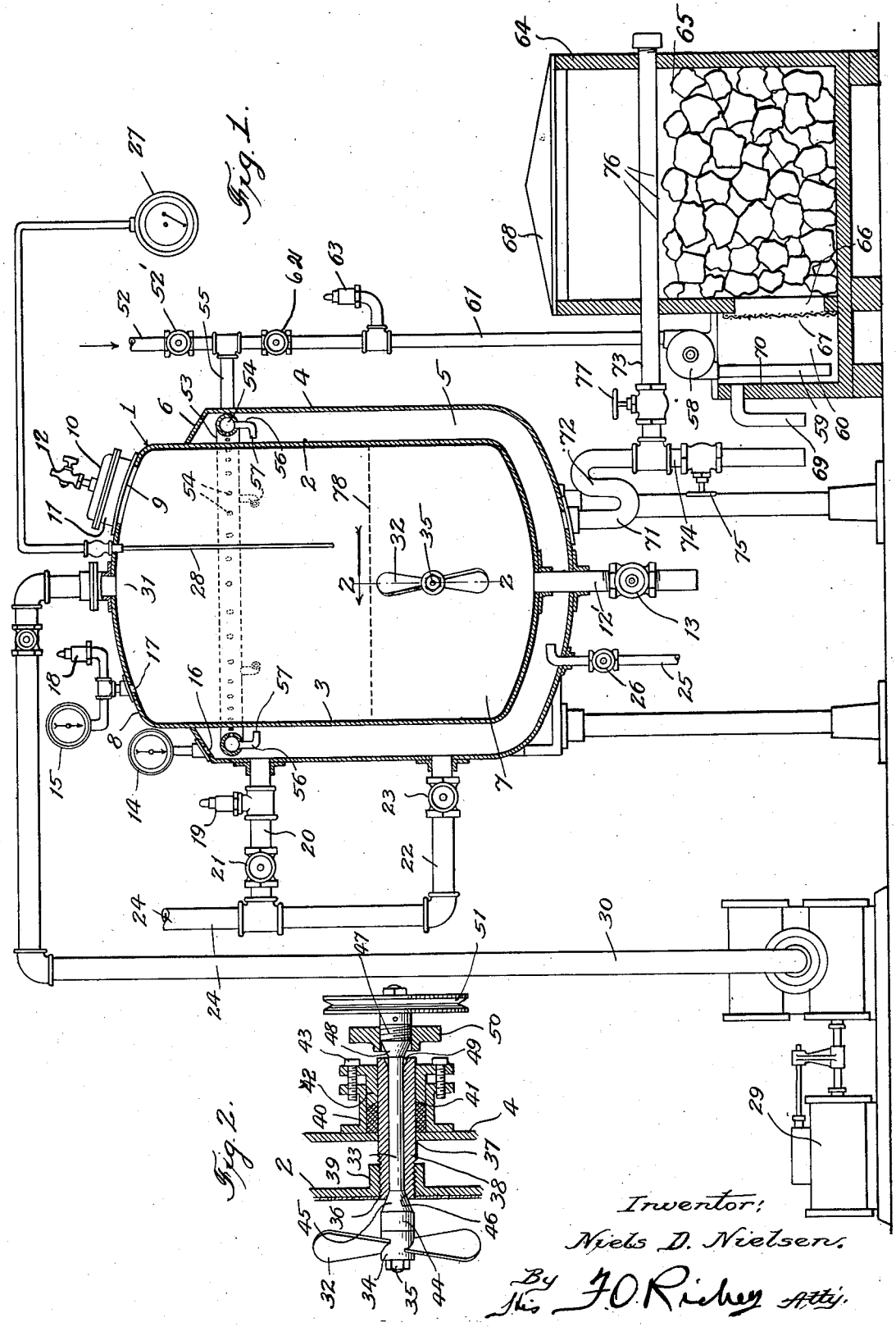

NIELS D. NIELSEN, OF ELYRIA, OHIO.

PROCESS OF TREATING MILK.

1,274,748.        Specification of Letters Patent.        Patented Aug. 6, 1918.

Application filed February 11, 1918.   Serial No. 216,622.

*To all whom it may concern:*

Be it known that I, NIELS D. NIELSEN, a citizen of the United States, residing at Elyria, in the county of Lorain and State of Ohio, have invented certain new and useful Improvements in Processes of Treating Milk, of which the following is a specification.

One of the objects of the invention is to provide a simple, economical and efficient process for treating milk, which is adapted to be used for pasteurizing, holding, cooling and condensing or evaporating milk, or for any of said purposes, so as to exterminate or reduce to a minimum the bacteria contained in the material treated, without detriment to such material, and as quickly as possible consistent with the accomplishment of the desired results. I also aim to enable the milk or material treated to be cooled and placed in containers without being exposed to contamination by being passed through or transferred to cooling apparatus or other devices before being placed in bottles or containers, and adapted to enable a separate cooler or cooling mechanism such as cooling coils or similar cooling devices to be dispensed with.

Other and further objects of the invention will appear from an examination of the following description of an embodiment of my invention and of the appended claims, and from an inspection of the accompanying drawings which are made a part of this specification.

In the accompanying drawings, Figure 1 is a diagrammatic view of an embodiment of my invention showing apparatus for treating milk, comprising a tank and stirring mechanism, and means for heating and cooling the contents or material to be operated upon, and shows my improved tank in central vertical section, and with an ice chest also shown in vertical section and provided with means for conducting brine or cooling liquid from the space or chamber formed between the inner and outer walls of the tank to the ice chest, means for pumping cooling liquid into the space formed between said inner and outer walls of the tank, and means for supplying and regulating the admission of steam for heating the tank and its contents. The figure also shows a vacuum pump provided with a conduit which communicates with the interior of the tank.

Fig. 2 is an enlarged detail view in central vertical section taken on line 2 of Fig. 1, looking in the direction of the arrow, and showing my improved stirring mechanism in side elevation.

In constructing a tank, stirring mechanism, and means for heating and cooling the tank and its contents, and for treating, holding and cooling milk in accordance with my invention and improvements, I provide a tank or receptacle 1, which is, by preference, in the form of a reservoir having vertical cylindrical walls, including inner walls 2 of metal, and provided with a lining 3 of glass or enamel, and an outer metallic wall 4, provided with a space 5 between such inner and outer walls. An annular flange or apron 6, encircles, and has its inner edge welded to, the inner wall 2, its outer edge being connected or integral with the outer wall 4, so as to cover and inclose the space 5 and form an air tight or hermetically sealed chamber, which entirely surrounds the inner casing on all sides, and also incloses the bottom.

A cover 8 is preferably used for said casing and chamber. This cover is, by preference, integral with the casing and is provided with an opening or manhole 9, having a cover 10 adapted to be secured in air-tight engagement with the flange or rim 11 which surrounds the manhole. The cover is removably secured in position to form a closure for the manhole by means of screws or other suitable, ordinary and well known securing means and a vent cock 12 having a valve-controlled passage communicating with the chamber 7 is provided and mounted by preference upon the removable cover 10.

A discharge pipe 12' leads from the bottom of the liquid containing chamber or reservoir 7, and is provided with a cock or valve 13 for opening and closing the discharge passage formed by said pipe and communicating with the chamber. Vacuum and pressure gages 14 and 15 are mounted in position to communicate with the chambers or spaces 5 and 7, respectively, the gage 14 being provided with a passage 16, which communicates with the chamber 5 and the gage 15 having a passage 17 communicating with the chamber 7. A safety valve 18, which may be of any ordinary and well known suitable construction, is mounted in position to communicate with the chamber 7, and a similar safety valve 19 is mounted in position to communicate with the chamber 5, said valve being mounted, by preference, upon an exhaust pipe 20 which forms the upper or high level exhaust passage leading from the annular chamber 5 formed between the inner and outer walls 2 and 4. This exhaust passage is provided with a controlling valve or cock 21 for opening and closing the passage when desired, and a lower exhaust passage or conduit 22 leads from the chamber 5 at a point below the level of the exhaust passage or conduit 20 and near the bottom of the chamber 5. The lower exhaust passage or conduit 22 is provided with a cock or valve 23 for opening and closing said passage, and communicates with a main exhaust pipe 24 into which the upper exhaust passage 20 leads when the cock 21 is in passage opening position.

A steam supply pipe 25, which communicates with a suitable source of steam supply (not shown), which may be in the form of a boiler of any suitable, ordinary or well known type, communicates with the interior of the chamber 5, and is provided with a cock or valve 26 for opening and closing said passage, and regulating the admission of steam to the interior of the chamber 5 for heating the casing 2 and its contents. A recording thermometer 27, having a stem 28, is mounted in position to record the temperature in the chamber 7, and a vacuum pump 29, which may be of any desired or well known form adapted to provide a suitable vacuum, or partial vacuum, in the chamber 7, is operatively connected with the tank by means of a pipe 30, the receiving end of which communicates with the upper extremity of the chamber 7, and forms an outlet passage 31 leading to the suction chamber of the pump 29.

The tank is provided with an agitator, here shown as a propeller 32, comprising agitator blades secured to a propeller shaft 33 by means of a central head or hub portion 34. The hub is secured to the shaft by means of a nut 35 in threaded engagement with the inner end of the shaft or by similar suitable securing means. The shaft extends into the chamber 7 through an opening 36 in the casing 2, and through an opening 37 in the outer wall 4, and is rotatively supported by a bearing sleeve or bushing 38, the inner extremity of which is in threaded engagement with a threaded annular flange 39, which may be integral with the casing 2 and surrounds the opening 36. The outer extremity of the bushing or journal bearing member 38 is mounted in a packing box 40 fixed to the outer wall 4 and provided with suitable packing material 41 which is held in snugly fitting engagement with the bushing by means of a packing gland 42, which is secured in position by means of screws or bolts 43, or similar securing means. The propeller shaft has an enlarged inner end or head 44, having a conical bearing surface 45, adapted to engage a tapered or concave seat 46 in or formed by the inner end of the journal bearing bushing 38. This shaft is provided at its outer extremity with a similar head or annular shoulder 47, having a conical or tapered surface portion 48 which extends into a similarly tapered concave seat 49 formed in the outer end of the journal bearing member or sleeve 38, and a nut 50 is mounted in threaded engagement with the head 47, and engagement with a stationary part of the structure so as to enable the conical surface portion 46 of the inner head 44 on the shaft to be held in air-tight engagement with its seat when the shaft is stationary and the propeller not in active operation. The escape of fluid from the chamber 7 is thus effectively prevented when the propeller is stationary.

When the agitating means, here shown as the propeller 32, is operated, the milk or liquid contained in the chamber 7 will be circulated rapidly in such a manner as to thoroughly agitate the liquid contents of the chamber throughout the entire mass of the material operated upon. The contents will thus be so evenly and rapidly exposed to the surfaces of the chamber that the walls 2 may be heated to a very high degree of temperature considerably above the boiling point of the liquid or milk without scorching or burning, or detrimentally affecting the milk appreciably, either with respect to its flavor or with respect to the condition of the particles of cream or butter fat, or what is commonly referred to as the cream line of the treated milk.

The rotation of the agitator in the operation of stirring the liquid also causes the conical bearing surface 45 of the propeller shaft to engage the conical seat 46, so as to prevent the escape of any liquid from the chamber 37, except an exceedingly small quantity, barely sufficient to properly lubricate the journal bearing of the propeller shaft. The propeller shaft is provided with a driving wheel 51, which may be of any desired ordinary and well known form adapted to connect the shaft with a motor or source of power for driving the same.

In order to provide means for cooling the tank and its contents, a main water supply pipe 52 is provided which is adapted to be connected with a water main or other suitable source of water supply for furnishing cooling water under pressure, and a coil or annular conduit, which may be in the form of a pipe 53, having a series of perforations 54 therein, is mounted in the upper part of the chamber 5 formed between the inner and outer walls of the tank, the annular passage 54, formed by the annular spray coil or pipe 53, is connected with the main water supply pipe 52 by means of a connecting pipe 55 which extends through the wall 4 and communicates with the passage 54. A series of drain passages 56 is provided for draining the coil 53. These drain passages are, by preference, in the form of angular depending tubes, the lower extremities 57 of which open toward the inner casing wall 2, and lead from the bottom of the passage 54, so as to force cooling water in the form of a spray or small jets against the inner casing wall, and also thoroughly drain the pipe 53. The perforations 54 also serve to discharge cooling water or spray, in small jets, against the casing wall 2.

There is provided a brine pump 58 having an inlet or suction passage 59 which communicates with a brine containing receptacle or chamber 60, and having a brine supply or discharge passage 61 which communicates with the conduit 55 leading to the passage 54 formed by the perforated pipe 53. The pipe 61 has a controlling cock or valve 62 for opening and closing the passage formed by said pipe and is provided with a safety valve 63, which may be in the form of an ordinary spring-pressed safety valve, such as is well known in the art. A refrigerator or ice chest 64, having a refrigerator or cooling compartment 65 adapted to contain ice or an equivalent cooling medium, and having a passage 66 communicating and adapted to conduct cool brine through a screen 67 and into the brine containing chamber 60, is provided, and arranged in position to supply cool brine to the brine pump 58, for cooling the tank 1 and its contents. The ice chest has a cover 68, and the brine chamber 61 has an overflow passage or outlet 69 which may be in the wall 70 of the brine chamber.

An outlet passage or conduit 71 leads from the bottom of the chamber 5 formed between the inner and outer walls of the tank 1 and is provided with a goose-neck or liquid sealed trap 72. The passage formed by the pipe 71 communicates with a pipe 73 through the medium of the trap 72, and also communicates with a discharge or waste pipe 74. The waste pipe 74 has a controlling cock 75 for opening and closing the discharge passage formed by said pipe; and the pipe 73, which leads into the cooling chamber 65, has an opening or openings 76 adapted to discharge cooling liquid received from the chamber 5 into the cooling chamber 65, and is provided with a controlling cock 77 for controlling the passage formed by the pipe 73 and leading from the trap 72 into the cooling chamber 65 or ice chest.

The main water supply pipe 52 has a controlling cock 52' for regulating the supply of water from the original source of water supply.

The apparatus above described is adapted to be used to advantage in the practice of my improved method or process of treating milk.

In practising my improved method or process of treating milk, and particularly the method of pasteurizing, holding and cooling milk, a supply of milk to be operated upon is placed in the treating chamber 7, and the agitating mechanism is set in operation by starting the driving mechanism for operating the same. The agitating mechanism, constructed and arranged as above described, is adapted to set the entire liquid contents of the tank in motion and cause the liquid to circulate with such evenness and rapidity, where it comes in contact with the inner surface of the wall 2, and throughout the entire mass of liquid, that the wall of the chamber 7 may be heated at once to a high degree of temperature considerably above the boiling point of the milk or liquid operated upon, and the milk or liquid may be, and in practice is, subjected to such a temperature, for instance, 220 degrees Fahrenheit, for a prolonged period of time, sufficient to bring the entire mass of milk or liquid to a temperature of 160° F., while exposed to a surface temperature at the inner surface of the glass or enamel lined wall of the treating chamber, such as would be produced by heating the outer surface of the wall 2 to approximately 220° F. The wall 2 being of metal, and the lining or covering of glass or enamel, the temperature of the glass or enamel lining, which would be in actual contact with the milk, would be somewhat below the temperature of the metallic portion of the wall 2 actually in contact with the steam or heating medium. The temperature at the surface of the glass lining, which is in actual contact with the milk during the operation of stirring and treating the milk, in accordance with my invention, and improved process, is, by preference, above 110° F., and I find in practice that the best results are accomplished by maintaining such a temperature that the glass lining will have a temperature of approximately 200° F., or in other words, a temperature produced by heating the metallic wall 2 of the receptacle by subjecting it to the action of steam at a temperature of 220° F. The heating of the walls of the receptacle or treating chamber by means of the introduction of steam at a temperature of approximately 220° F. into the chamber 5 and in contact with the wall 2 is in practice continued until the milk or liquid contained in the treating chamber has thus been heated to a temperature of between 140° F. and 160° F. throughout the entire mass of the liquid treated, and the entire mass is simultaneously stirred or agitated in such a manner as to cause the fluid to be kept in such rapid motion during such heating operation and while subjected to a temperature of preferably between 210° F. and 220° F., as to prevent scorching or injury of the milk or fluid treated.

In practising my improved process of pasteurizing milk, the milk to be treated is, by preference, introduced into the treating chamber or receptacle at a temperature below 40° F., or below a bacilli forming temperature, or temperature which is conducive or favorable to the growth and development of bacilli. It is well known by those skilled in the art to which this invention relates that bacilli or bacteria will develop in milk at temperatures between 40° F. and 110° F. with great rapidity as said temperatures are favorable to the growth of bacteria. It is also well known that temperatures above 110° F. are less favorable to the growth and development of bacteria, and that temperatures above 110° F., and particularly temperatures between 140° F. and 160° F. or even as low as 130° F., are not only unfavorable to the growth of bacteria but are actually destructive to the life of bacteria.

I have found in practice that milk can be heated to a temperature of 160° F. without scorching or injury to the milk, and that it can be introduced into a treating chamber at a temperature of 38° F. and subjected to the action of heat sufficient to raise the temperature of the entire mass of milk or fluid to a temperature of 140° F. within a period of eight minutes without scorching or injury to the milk.

Having introduced a quantity of milk to be treated into a treating chamber or receptacle at a temperature below 40° F., steam is introduced into the chamber 5 in contact with the outer surface of the wall of the treating chamber, the steam being at a temperature of approximately 220° F., as already suggested, thus subjecting the mass of milk to a temperature of between 200° F. and 220° F., which is the temperature of the steam heated wall of the treating chamber or receptacle. This temperature is maintained for and during a sufficient period of time to raise the temperature of the liquid from 38° F. to a temperature of between 140° F. and 160° F. The entire mass of milk or fluid is at the same time stirred or agitated in such a manner as to keep the entire mass in such rapid motion during the entire period during which it is being heated, as to prevent scorching or injury to the milk during such heating and stirring of the mass. The entire batch or mass of milk, having thus been rapidly heated from a temperature of 40° F. or lower, to a temperature of approximately 160° F., and above 110° F., the time for the growth and development of bacteria, with the fluid at temperatures between 40° F. and 110° F., is reduced to a minimum and to all intents and purposes entirely prevented, and the bacteria originally contained in the milk or fluid before the beginning of the operation are thus destroyed or reduced to a minimum in the shortest possible time consistent with the treatment or pasteurizing of the milk without scorching or other detrimental effect.

During the admission of the steam into the chamber 5, for heating the material, which is accomplished by means of the steam supply conduit 25, the high level steam outlet conduit 20 is kept open.

The operation or process of pasteurizing the milk or fluid in the manner above described, having been completed, the supply of steam is then shut off, and the upper exhaust steam conduit 20 is closed. The milk or material treated is thus in condition to be cooled or allowed to cool, and to be transferred directly from the treating chamber into bottles or receptacles or containers of any desired suitable form. It is also in condition to be condensed or evaporated while in the treating chamber, if desired. In case the treated material is to be held in the receptacle, or placed in bottles or receptacles without further treatment, such, for instance, as condensation or evaporization, it is usually desirable to cool the material to a temperature suitable for holding or for handling, for instance, a temperature of 40° F.

In order to cool the material contained in the chamber 7. cooling liquid may be admitted to the chamber 5 by first opening the cock 52' which controls the water supply conduit 52. The cock 75 may then be opened, so as to allow the cooling water to flow into and through the chamber 5 from the water supply conduit 52 and pipe 55, and out through the discharge pipes 71 and 74, until the temperature of the fluid treated has been reduced to a considerable extent. In case the available cooling water is sufficient in quantity and cool enough for the purpose, it may be found that no other cooling medium will be required.

Whenever the supply of cooling water is limited, or not sufficiently cool to lower the temperature of the milk or fluid to the desired extent, the outlet conduit 74 may be closed before shutting off the cooling water from pipe 52, and cock 77 may be opened and a sufficient quantity of water permitted to flow into the refrigerating or cooling chamber 65 of the ice box (unless the refrigerator chamber 65 has been previously supplied with sufficient water) for making brine. The main water supply conduit 52 is then closed, and the brine pump 58 is set in operation, after opening the cock 62, which controls the brine conduit 61. Cooled liquid, which is by preference in the form of brine, is thus caused to flow through the chamber 5, and from said chamber back to the cooling chamber 65 to be cooled and again caused to flow into and through the chamber 5 until the milk or liquid in the treating chamber has been reduced to the desired temperature.

The milk thus treated or pasteurized and cooled, is in condition for bottling, or for being placed in any desired receptacle or receptacles, by passing directly from the treating chamber, or treating and holding chamber 7 into the bottles or receptacles. The transferring of the milk or treated fluid to a cooler and the exposure of the milk to contamination or pollution is thus avoided.

In case it becomes desirable to hold the treated milk or fluid for a period of time before placing it in a container or containers, it is plain that the tank is adapted to serve for holding the fluid and to keep it at the desired uniform and unvarying temperature for any desired length of time. In order to enable this to be accomplished in a highly efficient manner it is only necessary to stop the brine pump when the treated fluid has been cooled to the desired temperature, and to close the cock 62, and allow the cooling liquid to run out of the chamber 5 of the tank until said chamber is empty. In case the liquid thus emptied from the chamber is brine, it should of course be allowed to flow into the cooling chamber 65 of the refrigerator. When not required to be used again, the liquid from the chamber 5 may be discharged through the waste pipe or conduit 74, and the cock 75 should then be closed.

In order to render the treating and holding tank even more efficient as a means for holding the treated milk or fluid for any desired length of time and at a desired uniform temperature, a practical and very effective and desirable vacuum or partial vacuum is provided in the chamber 5 between the outer and inner walls of the tank, and the walls of the tank are rendered heat-resisting or heat-insulated to the greatest possible extent, by admitting steam to the interior of the chamber 5 by opening the steam supply cock 26 for a short time, and allowing the products of condensation to escape by opening the cock 75, and then closing the cocks 26 and 75 while live steam is in the chamber 5, and when all other cocks and conduits communicating with the chamber 5 are closed, thus providing a vacuum or partial vacuum in the chamber 5 and providing a holding tank, the walls of which are heat-insulated. The tank is thus adapted to serve as a vacuum holding tank or thermos tank or receptacle, and is like a thermos bottle in its heat-resisting qualities.

During the operation of heating and stirring the milk or fluid in the process of pasteurizing milk, the upper opening 9, or the top of the treating chamber 7 may be open.

In order to carry out the process of condensing or evaporating the milk to be treated, it is only necessary to keep the top opening 9 and all openings to the chamber 7, except the upper opening or passage 31, closed, during the operation of stirring or agitating and heating the milk, and to have the passage 31, which leads from the chamber 7 to the vacuum pump opening and the pump 29 in operation, with the high-level steam exhaust conduit 20 closed and the low-level or lower steam exhaust conduit 22 and cock 23 open, and to continue the stirring and heating until the desired evaporation and condensation has been accomplished.

The supply of steam may then be shut off, and the process of cooling may be carried out and completed in the manner already described in connection with the process of pasteurizing.

When the high-level steam exhaust conduit is closed and the lower steam exhaust conduit is open, the hot steam is prevented from ascending to the top of the chamber 5 by reason of the fact that circulation is prevented from occurring in the upper part of the chamber above the level of the lower steam exhaust conduit. The undesirable heating of the walls of the treating chamber above the level of the milk operated upon in the operation of condensing or vaporizing the milk, is thus prevented, and only so much of the chamber as contains milk or fluid to be treated is exposed or subjected to the action of the steam in actual contact with the receptacle wall to be heated. The top of the milk or fluid, during the latter part or at the completion of the operation of condensing or evaporating a batch of milk or fluid, is indicated by the broken line 78, in Fig. 1.

I claim—

1. The process of treating milk, which consists in introducing into a receptacle a batch of milk to be treated, increasing the temperature of the entire mass of fluid at the rate of at least 12° F. per minute to a temperature of 140° F. by applying a heating medium to the walls of the receptacle, and keeping the mass of fluid in such rapid motion as to prevent scorching of the fluid during such heating of the mass.

2. The process of treating milk, which consists in introducing into a receptacle a quantity of milk at a temperature below 40° F., subjecting the walls of the receptacle which are in contact with the milk to a temperature between approximately 212° F. and 220° F., until the mass is heated to a temperature of at least 140° F., and simultaneously stirring the fluid and maintaining the entire mass in such rapid motion during the heating operation as to prevent the heat thus produced from scorching or injuring the milk.

3. The process of heating milk or other liquid food, which consists in placing the milk or other liquid food in a vessel, agitating the same, heating the same rapidly while in agitation to a temperature of about 140° F. and then cooling such milk or other food to about 40° F. without removing the same from such vessel.

4. The process of treating milk or other liquid food, which consists in placing the milk or other food in a vessel, agitating the same, heating the same while in agitation to a temperature of about 140° F. and then cooling such milk or other food to about 40° F. without removing the same from such vessel.

5. The process of treating milk or other liquid food, which consists in placing the milk or other food in a vessel, agitating the same so as to evenly and quickly expose all parts of the milk or other liquid food to the walls of the vessel, rapidly heating such food while being so agitated to a temperature of about 140° F., and then cooling such food to a temperature of about 40° F. without removing the same from about such vessel.

6. The process of treating milk or other liquid food, which consists in placing the milk or other food in a vessel, agitating the same so as to evenly and quickly expose all parts of the milk or other liquid food to the walls of the vessel, rapidly heating such food while being so agitated to a temperature of about 140° F. and then cooling such food to a temperature of about 40° F. while so agitated, without removing the same from such vessel.

7. The process of treating milk or other liquid food, which consists in placing such food in a vessel, agitating such food while in such vessel so as to evenly and quickly expose all parts of the food to the walls of the vessel, rapidly heating such food through a heating agency applied to the walls of said vessel until the temperature of such food is about 140° F., and then cooling such food while thus in agitation, to a temperature of about 40° F. by applying a cooling agency to the walls of said vessel and without removing said food from said vessel.

8. The process of treating milk or similar liquid food, which consists in bringing such food to a temperature of about 40° F. and running the same at such temperature into a vessel, applying to the walls of such vessel a heating medium preheated to a temperature of about 212° F. to 220° F., and thereby at a rate of 12° F. or 15° F. per minute heating such food to about 160° F. and above 110° F., thereby limiting the time for development of bacteria, and meanwhile agitating the food to evenly and quickly expose all parts thereof to the walls of the vessel and therethrough to the heating medium, and thereby preventing scorching of such food.

9. The process of treating milk or similar liquid food, which consists in bringing such food to a temperature of about 40° F. and running the same at such temperature into a vessel, applying to the walls of such vessel a heating medium preheated to a temperature of about 212° F. to 220° F., and thereby at a rate of 12° F. or 15° F. per minute heating such food to about 160° F. and above 110° F., thereby limiting the time for development of bacteria, and meanwhile agitating the food to evenly and quickly expose all parts thereof to the walls of the vessel and therethrough to the heating medium and thereby preventing scorching of such food, and then cooling such food while thus in agitation to a temperature of about 40° F. by applying a cooling agency in place of such heating agency to the walls of said vessel and without removing such food from said vessel.

In witness whereof, I have hereunto set my hand this 9th day of Feb., 1918.

NIELS D. NIELSEN.